United States Patent [19]

Laine

[11] Patent Number: 4,826,666

[45] Date of Patent: May 2, 1989

[54] METHOD OF PREPARING METAL CARBIDES AND THE LIKE AND PRECURSORS USED IN SUCH METHOD

[75] Inventor: Richard M. Laine, Palo Alto, Calif.

[73] Assignee: SRI International, Menlo Park, Calif.

[21] Appl. No.: 177,860

[22] Filed: Mar. 22, 1988

Related U.S. Application Data

[63] Continuation-in-part of Ser. No. 727,524, Apr. 26, 1985, abandoned.

[51] Int. Cl.$^4$ .................... C01G 43/00; C01B 31/30; C01B 31/34
[52] U.S. Cl. .................... 423/249; 423/439; 423/440; 423/256; 75/20 R; 75/28; 75/84; 75/84.1 R; 75/82; 75/83; 75/85; 75/86; 75/62; 75/80; 75/81; 501/87; 501/93; 264/56; 264/80
[58] Field of Search ............ 264/56, 80; 501/87, 501/93; 75/20 R, 28, 84, 84.1 R; 423/439, 440, 256

[56] References Cited

U.S. PATENT DOCUMENTS

| | | | |
|---|---|---|---|
| 2,872,350 | 2/1959 | Homer et al. | 428/545 |
| 2,922,819 | 1/1960 | Chatt et al. | 260/606.5 |
| 3,064,021 | 1/1962 | Wilkinson | 260/429 |
| 3,070,615 | 12/1962 | Seyferth | 260/429.7 |
| 3,155,532 | 11/1964 | Basile . | |
| 3,377,141 | 4/1968 | Hardy et al. | 423/256 X |
| 3,494,738 | 2/1970 | Gray et al. | 423/439 |
| 3,554,782 | 1/1971 | Nieberlein | 423/439 X |
| 3,574,672 | 4/1971 | Tarver | 423/440 X |
| 3,764,550 | 10/1973 | Block et al. | 423/256 X |
| 3,800,023 | 3/1974 | Haas | 423/256 X |
| 3,865,745 | 2/1975 | Block et al. | 423/256 X |
| 3,880,769 | 4/1975 | Googin et al. | 423/256 X |
| 3,976,749 | 8/1976 | Wedemeyer | 423/256 X |
| 4,333,915 | 6/1982 | Iwai et al. | 501/87 X |
| 4,333,916 | 6/1982 | Iwai et al. | 501/87 X |
| 4,426,366 | 1/1984 | McCandlish et al. | 501/87 X |
| 4,622,215 | 11/1986 | Janey | 423/439 |

FOREIGN PATENT DOCUMENTS 1329628 5/1963 France .
1359694 3/1964 France .

OTHER PUBLICATIONS

Omori, M., et al., *Bull. Chem. Soc. Japan* 48 (4):1291-95 (1975).
Urisu, T. and K. Kuchitsu, *Chem. Letters*, pp. 813-818 (1972) (Chemical Society of Japan).
Yajima, S., et al., *Chem. Letters*, pp. 931-934 (1975) (Chemical Society of Japan).
Yajima, S., et al, *Chem. Letters*, pp. 1209-1212 (1975) (Chemical Society of Japan).
Yajima, S., et al., *Nature* 264: 238-9 (1976).
Yajima, S., et al., *Chem. Letters*, pp. 551-554 (1976) (Chemical Society of Japan).
Yajima, S., et al., *Nature* 261, pp. 683-685 (1976).
Yajima, S., et al., *J. Am. Ceram. Soc.* 59 (7-8): pp. 324-327 (1976).
Yajima, S., et al., *Nature* 267: pp. 823-825 (1977).
Yajima, S., et al., *Ceramic Bulletin* 56 (12): 1060-62 (1977).

(List continued on next page.)

*Primary Examiner*—Matthew A. Thexton
*Attorney, Agent, or Firm*—Ciotti & Murashige, Irell & Manella

[57] ABSTRACT

Preparation of metal carbides, nitrides, borides, silicides and phosphides, also metal alloys and pure metals, by providing a precursor in which there are organic ligands bonded to the metal or metals, such precursor having the element X also bonded directly or indirectly to the metal or metals, the ligand-metal bonding being weaker than the X-metal bonding whereby on pyrolysis the product $M_aX_b$ results in which M represents the metal or metals, X represents C, N, B, Si, P and a and b represent the atomic proportions of M and X. The subscript b may be zero if an alloy or pure metal is to be prepared. The product $M_aX_b$ can be prepared by relatively low temperature pyrolysis and the precursor can be used as a solution or a low melting solid. This enables one to apply a surface coating or to shape the precursor into a fiber, rod or other shape and to pyrolyze the coating or shaped article. M is a transition, lanthanide or actinide metal or tin.

9 Claims, 1 Drawing Sheet

X-RAY POWDER DIFFRACTION PATTERN
OF $Cp_2W_2(CO)_4$ DMAD PYROLYZED AT
750° C FOR 20 MINUTES IN A NICKEL TUBE

OTHER PUBLICATIONS

Yajima, S., et al., *Nature* 266 (7): pp. 521–522 (1977).
Yajima, S., et al., *Nature* 266 (7): pp. 522–524 (1977).
Yajima, S., et al., *J. Mat. Sci.* 13: 2569–76 (1978).
Yajima, S., et al., *Nature* 273 (15): 525–27 (1978).
Chem. Abstr. 78827; vol. 74 (1971), p. 161, "Metallic Films Obtained by Pyrolysis . . . ".
Chem. Abstr. 97: 94774; vol. 97 (1982), p. 148, "Preparation of Metal Nitrides by . . . ".
Aylett et al., "Chemical Vapour Deposition of Transistion Metal Silicides . . . ", *J.C.S. Dalton* (1977), pp. 2058–2061.
Sugiyama, et al., "Low Temperature Deposition of Metal Nitrides by Thermal Decomposition of Organometallic Compounds", *J. Electrochem. Soc.: Solid State Science and Technology*, Nov. 1975, vol. 122, No. 11, pp. 1545–1549.
Aylett, et al., "Chemical Vapour Deposition of Metal Silicides from Organometallic Compounds with Silicon Metal Buds", *Vacuum*, vol. 135, No. 10–11 (1985), pp. 435–439.
Yajima, Seishi, "Synthesis of Ceramics Using Organometallic Polymers", *Kagaku Kojo*, 23(7)(1979), pp. 38–41.
Hurd et al., "Tungsten Carbide by Pyrolysis of Tungsten Hexacarbonyl", *Ind. and Engng. Chem.*, vol. 44(10), (Oct. 1952), pp. 2432–2435.
Hasegawa et al., "Synthesis of Continuous Silicon Carbide Fibre", *J. Mat. Sci.*, 18 (1983), pp. 3633–3648.
Anon., "Technology Forecast '86, Surface Treating and Coating", *Met. Prog.* (Jan. 1986), pp. 45–48.
Wachtman, Jr., et al., "Ceramic Films and Coatings", *Chem. Eng. Prog.* (Jan. 1986), pp. 39–46.
Derwent Abstract No. 09810x/06 (6th Week, 1976), "Iron Carbide Prepn. . . . ".
Derwent Abstract No. 02749x/02 (2nd Week, 1976), "Iron Carbide Mfr. . . . ".
Chemical Abstract No. 517635, vol. 100 (1984), "Thermodynamic Study . . . ", p. 37.
Chemical Abstract No. 195,951k, vol. 99 (1983), "Poly (Titanocarbosilanes)", p. 593.
Chemical Abstract No. 195,948q, vol. 99 (1983), "Organometallic Copolymers", p. 593.
Chemical Abstract No. 167,514m, vol. 91 (1979), "Novel Applications . . . ", p. 680.
Chemical Abstract No. 92,657w, vol. 86 (1977), "Iron Carbide", p. 184.
Chemical Abstract No. 77,559x, vol. 86 (1977), "Precipitation of Titanium Carbide . . . ", p. 325.
Chemical Abstract No. 164,968c, vol. 85 (1976), "Use of Organotitanium . . . ", p. 329.
Chemical Abstract No. 111,618g, vol. 85 (1976), "Deposition of Metal . . . ", p. 200.
Chemical Abstract No. 105,373h, vol. 79 (1973), "Pyrolysis of . . . ", p. 441.
Chemical Abstract No. 7,742j; vol. 73 (1970), "Effect of Electron . . . ", p. 294.
Laine, et al., "Reactions of $(Tr-C_5H_5)W(CO)_3H$ with Dimethylacetylenedicarboxylate . . . ", *J. Organmetal. Chem.*, vol. 124 (1977), pp. 29–35.

X-RAY POWDER DIFFRACTION PATTERN
OF $Cp_2W_2(CO)_4$ DMAD PYROLYZED AT
750° C FOR 20 MINUTES IN A NICKEL TUBE

METHOD OF PREPARING METAL CARBIDES AND THE LIKE AND PRECURSORS USED IN SUCH METHOD

CROSS-REFERENCE TO RELATED APPLICATIONS

This application is a continuation-in-part of U.S. patent application Ser. No. 727,524, filed Apr. 26, 1985.

FIELD OF THE INVENTION

This invention relates to the preparation of metal carbides, nitrides, silicides, borides and phosphides and to other metallic products.

BACKGROUND

By way of example of methods used in the prior art, tungsten metal in finely divided form is mixed with carbon black and the mixture is heated typically to a temperature of about 1700° to 2300° C. This results in tungsten carbide which is usually mixed with a binder metal such as cobalt and is then subjected typically to shaping into the desired shape, presintering, shaping and sintering.

Other hard metal powders are produced in similar fashion except that carburization is done at the metal oxide stage rather than with the metal itself.

Such methods pose difficulties such as the need for very high temperatures. Further difficulties are also encountered. If it is desired, for example, to apply the carbide as a coating, it has to be done by chemical vapor deposition or physical vapor deposition which is limited to line of sight procedures.

SUMMARY OF THE INVENTION

It is an object of the present invention to provide better methods of producing metal carbides, nitrides, silicides, borides, phosphides, etc., also metal alloys, such methods providing one or more of the following advantages:

(1) Lower temperatures in the preparation of the metal compound or alloy $M_aX_b$ wherein M represents the metal or metals, X represents the combining element or elements and the subscripts a and b represent the atomic proportions of M and X.

(2) A simplified procedure.

(3) Greater control over the combining proportions, a and b.

(4) More facile methods of application of $M_aX_b$ to end products.

(5) Potential routes to materials or material morphologies that have heretofore been impossible or difficult to prepare.

These and other objects of the invention will be apparent from the ensuring description and the appended claims.

DETAILED DESCRIPTION

Figure 1:
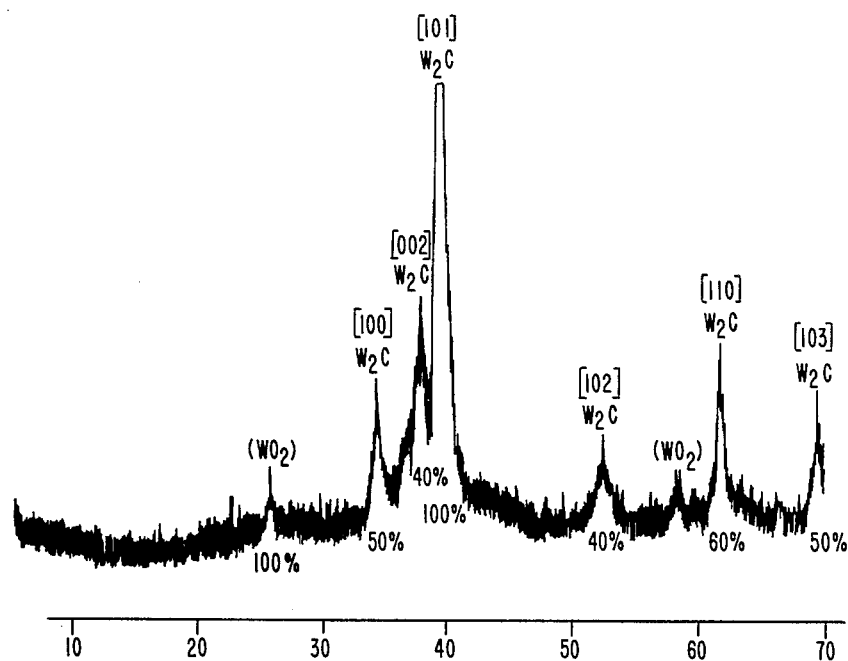
FIG. 1 is an x-ray powder diffraction spectrum of $Cp_2W_2(CO)_4$ DMAD pyrolyzed according to the method of Example 1.

I have found that organometallic complexes of the selected metal (hereinafter called precursors) can be prepared which are soluble in common organic solvents or can be melted at relatively low temperatures. Solutions can be applied to the surface of a substrate, heated to vaporize the solvent and then pyrolyzed on the surface. Melts of solid precursors can be shaped into fibers, rods, etc. and pyrolyzed. The pyrolysis can be carried out at relatively low temperatures to provide the substance $M_aX_b$. Yet the precursors are not so volatile that they cannot be pyrolyzed.

The organometallic precursor contains the metal M associated with the element X and with ligands. The element X may be bonded directly to M or it may be contained in one or more of the ligands, such that upon pyrolysis the ligands are lost with the exception of X which is bound to, or which becomes bound to the metal M. Preferably the ligands are free of halogen or oxygen directly bonded to the metal M. When possible, the precursor is designed such that there are multiple bonds between M and X to increase the likelihood that these two elements will retain a bonding interaction during pyrolysis. M represents a single metal or two or more different metals and X represents one or more elements.

The ligands endow the precursor with solubility in organic solvents or provide a material which is solid and meltable. Therefore solutions or melts of the precursors can, for example, be applied to a surface by dipping or brushing. Solutions of the precursors, if sufficiently viscous and non-volatile, can be extruded in the form of rods, fibers, etc. The precursors may in certain cases be polymerized and the polymers may be shaped into the intended form before pyrolysis. Polymeric precursors may result directly from the method of preparation. The precursors can be pyrolyzed at relatively low temperatures. The method of application as coatings is not limited to line of sight.

Another aspect of the invention is the use of certain non-volatile precursors which upon pyrolysis leave the metal M in pure form; i.e. the complex forms the metal M and does not form a metal carbide, nitride, etc. This aspect of the invention is useful in depositing refractory metals such as tungsten on substrates such as steel, titanium, ceramics, silicon and gallium arsenide. An example of a suitable non-volatile precursor for cobalt is $Co_6(CO)_{16}$ described in Advances in Organometallic Chemistry, Vol. 14, page 287 (1976).

In another embodiment of the invention the component X is another metal rather than carbon, nitrogen, silicon, boron or phosphorus and the end product is an alloy. The use of precursors of the present invention to produce alloys is useful where the alloy has a high melting point and is to be deposited on a substrate which is low melting or which would be damaged by contact with the molten alloy.

Examples of M and X pairs are set forth in Table I. X may be carbon, nitrogen, silicon, boron or phosphorus. X may also be a metal other than M. M is a transition metal, a lanthanide metal, an actinide metal or tin. It will be understood that M may be more than one metal and that X may be one or more of the elements C, N, B, Si or P.

TABLE I

| M | X | M | X | M | X = $M_1$ |
|---|---|---|---|---|---|
| Ti | C | Fe | N | Ag | Ru |
| W | C | Hf | N | Ag | Pd |
| Hf | C | Ta | N | Nb | Sn |
| Fe | C | Ti | B | Co | Nd |
| Cr | C | Fe | B | Co | Fe |
| Ta | C | Fe | Si | Au | Pd |
| Cr | C | Pd | Si | Au | Ru |
| V | C | Ru | Si | Co | Zn |

TABLE I-continued

| M | X | M | X | M | X = M₁ |
|---|---|---|---|---|---|
| Nb | C | Rh | Si | | |
| Ti | N | Co | P | | |
| W | N | Fe | P | | |

Examples of suitable solvents for the precursors are $CH_2Cl_2$, $CHCl_3$, $CO_2$, $SO_2$, sulfolane, MeOH, EtOH, $Et_2O$, glyme, diglyme, THF, freon, benzene, toluene, DMSO, DMF, N-methylpyrolidone, hexane, and pentane.

The following specific examples will serve to illustrate the practice and advantages of the invention.

EXAMPLE 1.

Preparation of Tungsten Carbide and Oxycarbide

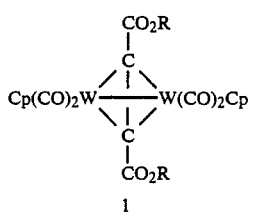

Compound 1 is prepared as described by Ford and Laine in Journal of Organometallic Chemistry, Vol. 124, p. 29 (1977). Cp represents the cyclopentadienyl group. Precursor 1 is placed in a quartz or nickel boat and is pyrolyzed in an atmosphere of nitrogen or argon at 500° to 950° C. for 10 to 30 minutes. Conversion to $W_2C$ resulted where the boat was of nickel and where it was of quartz the product was tungsten oxycarbide, $W_2(C,O)$. The difference in results between nickel and quartz containers is believed to be due to the fact that quartz supplies oxygen to form oxycarbide. It is believed that this could be prevented by coating the quartz container with tungsten.

FIG. 1 of the drawings shows the X-ray powder diffraction pattern of the product of pyrolysis in a nickel boat.

The tungsten oxycarbide is useful to coat alloys and as electrode material in electrochemical reactions.

The tungsten carbide, $W_2C$, is useful for hard, corrosion and wear resistant surfaces and can be used on cutting edges for machining tools.

The compound 1 is soluble in common organic solvents such as methanol, methylenedichloride, diethylether, etc. In solution form it can be applied to a substrate, for example, by brushing or dipping. Upon heating the solvent is evaporated and the compound 1 can by pyrolyzed to form a carbide or oxycarbide.

Compound 1 may also be used as such without dissolving it in a solvent and polymer derivatives can be formed into rods, fibers or other shapes and pyrolyzed.

Among suitable precursors are the following which are described in the literature.

TABLE II

| Precursor | Literature Reference |
|---|---|
| *Carbide Precursors* | |
| $Fe_5(CO)_{15}C$ | Adv. Organometallic Chem. (1976) 14, 285, 288–289 |
| $[Fe_6(CO)_{16}C]^{2-}$ | Adv. Organometallic Chem. (1976) 14, 285, 288–289 |
| $[Co_8(CO)_{18}C]^{2-}$ | Adv. Organometallic Chem. (1976) 14, 285, 288–289 |
| $Ru_6(CO)_{17}C$ | Adv. Organometallic Chem. (1976) 14, 285, 288–289 |
| $Ru_6(CO)_{14}(C_9H_{12})C$ | Adv. Organometallic Chem. (1976) 14, 285, 288–289 |
| $[Rh_6(CO)_{15}C]^{2-}$ | Adv. Organometallic Chem. (1976) 14, 285, 288–289 |
| $Rh_8(CO)_{19}C$ | Adv. Organometallic Chem. (1976) 14, 285, 288–289 |
| $Rh_{12}(CO)_{25}(C_2)$ | Adv. Organometallic Chem. (1976) 14, 285, 288–289 |
| $[Rh_{15}(CO)_{28}(C)_2]^-$ | Adv. Organometallic Chem. (1976) 14, 285, 288–289 |
| $Ru_5C(CO)_{15}$ | Adv. Organometallic Chem. (1976) 14, 285, 288–289 |
| $Os_5C(CO)_{15}$ | J. Organometallic Chem. (1973) 57, C82–C83 |
| $Co_2(CO)_6(RC\equiv CR)$ (R = alkyl, aryl) | Ibid (1983) 259, 253 |
| $Ru_6C(CO)_{16}C_6H_2(CH_3)_3$ | Adv. Organomet. Chem. (1976) 14, 285 |
| $Ru_6C(CO)_{17}$ | Adv. Organomet. Chem. (1976) 14, 285 |
| $Cp_2VC\equiv C-C(CH_3)_3$ | J. Organometallic Chem. (1984) 265, 249–255 |
| Alkylidynetricobalt-nonacarbonyl complexes | J. Organometallic Chem. (1976) 162, 89–98 |
| $Cp_2W_2Ir_2(CO)_6(\mu_3\text{-}CPh)$ $(\mu_3\text{-}\eta^3\text{-}C_3Ph)$ | Organometallics (1984) 3, 1585 |
| $Cp_2Ti(PhC\equiv CPh)$ | J. Organometallic (1983) 243, 157 |

Certain metal complexes containing two metals in the complex may be pyrolyzed to produce an alloy of the two metals. Examples are given in Table III.

TABLE III

| Precursor | Literature Reference |
|---|---|
| *Alloy Precursors* | |
| $[CpYb]Co(C_5H_4R)_2(\mu_3\text{-}CO)_4$ | J. Chem. Soc. Chem. Commun. (1984) 809 |
| $[Re_4Cu_2H_{16}L_6](PF_6)_2$ | J. Am. Chem. Soc. (1983) 105, 5137 |
| $Au_2Ru_4(\mu_3\text{-}H)_2(CO)_{12}(PPh)$ | J. Chem. Soc. Chem. Commun. (1983) 1332 |
| $Ln[Co(CO)_4]_2$ [Ln = Sm/Eu/Yb] | Adv. Organometallic Chem. (1976) 19, 285, 288, 289 |
| $[Co_5Ni_2(CO)_{14}]$ | Adv. Organomet. Chem. (1976) 14, 285 |
| $[Co_4Ni_2(CO)_{14}]^{2-}$ | Adv. Organomet. Chem. (1976) 14, 285 |
| $[Mo_2Ni_3(CO)_{16}]^{2-}$ | Adv. Organomet. Chem. (1976) 14, 285 |
| $[W_2Ni_3(CO)_{16}]^{2-}$ | Adv. Organomet. Chem. (1976) 14, 285 |
| $(Cp)_2NbH_2ZnCp$ | Organometallics (1984 3, 156 |
| *Nitride Precursors* | |
| $H_2Ru_3(CO)_9NH$ | J. Chem. Soc. Chem. Commun. (1984) 186 |
| $[FeRu_3N(CO)_{12}]^-$ | JACS (1984) 106, 4799 |
| $NOs(CH_2SiMe_3)_4$ | JACS (1984) 106, 7493 |
| $[W(NPh)Me_3]_2(\mu\text{-}\eta^1,\eta^1\text{-}NH_2NH_2)$ $(\mu\text{-}\eta^2,\eta^2NHNH)$ | JACS (1984) 106, 8316 |
| *Boride Precursors* | |
| $(H)Fe_3(CO)_9(\mu_3\text{-}BH_4)$ | JACS (1984), 106 4633 |
| $HFe_4(CO)_{12}BH_2$ | Organometallics (1983) 2, 825 |
| $(C_4H_4B\text{—}Ph)Ru(CO)_3$ | Angew. Chem. Int. Ed. (1983) 22, 996 |
| $V(C_5H_5B\text{—}CH_3)_2$ | J. Organomet. (1984) 265, 225 |

The precursor may be in the form of a polymer. A polymer has the advantage of being more easily shaped, spun, etc. Examples of such polymers and their preparation are as follows.

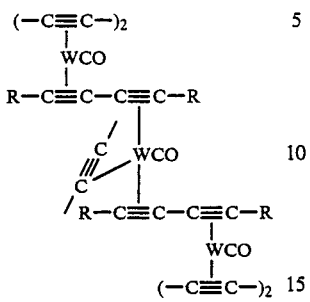

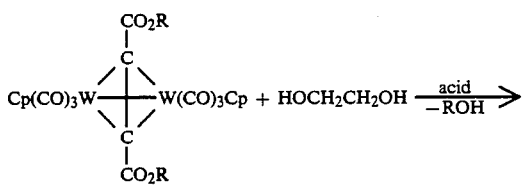

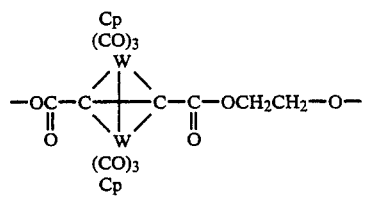

It will therefore be apparent that new and useful methods of producing metal carbides, nitrides, borides, silicides and phiosphides, also metal alloys and pure metals, have been provided. Also new and useful precursors for the same and new methods and materials have been provided for applying metal carbides, etc., metal alloys and pure metals to solid substrates and for forming such materials into useful shapes such as fibers, rods, etc.

I claim:

1. A method of producing a shaped product $M_aX_b$ which M represents one or more metals selected from the group consisting of transition metals, lanthanide metals, actinide metals and tin, X represents carbon, and a and b represent the atomic proportions of M and X, and b may be zero, comprising the steps of, in sequence:
   (a) providing a precursor to $M_aX_b$ that is non-volatile upon pyrolysis and which comprises an organometallic complex, said complex including one or more metal atoms M which may be the same or different, and wherein each of said metal atoms M is bound to an organic ligand, said organometallic complex further containing the element X either directly bound to one or more of said metal atoms M or contained within said ligands or both;
   (b) optionally either:
      (i) dissolving said precursor in an organic solvent to give a precursor solution, the solvent selected such that the precursor can be dissolved to a concentration at which the precursor solution has a viscosity sufficient to allow extrusion into a desired form; or
      (ii) melting said precursor;
   (c) shaping said precursor into a desired form; and
   (d) pyrolyzing said shaped precursor, at a temperature in the range of 500° C. to 950° C., to give $M_aX_b$ as a residue substantially free of organic materials.

2. The method of claim 1, wherein said precursor is free of metal-halogen and metal-oxygen bonds.

3. The method of claim 2, wherein said precursor is selected from the group consisting of $Fe_5(CO)_{15}C$, $[Fe_6(CO)_{16}C]^{2-}$, $[Co_8(CO)_{18}C]^{2-}$, $Ru_6(CO)_{17}C$, $Ru_6(CO)_{14}(C_9H_{12})C$, $[Ru_6(CO)_{15}C]^{2-}$, $Rh_8(CO)_{19}C$, $Rh_{12}(CO)_{25}(C_2)$, $[Rh_{15}(CO)_{28}(C)]^{2-}$, $Ru_5C(CO)_{15}$, $Os_5C(CO)_{15}$, $Co_2(CO)_6(RC\equiv CR)$, where R is alkyl or aryl, $Ru_6C(CO)_{16}C_6H_2(CH_3)_3$, $Ru_6C(CO)_{17}$, $Cp_2VC\equiv C-C(CH_3)_3$, alkylidynetricobalt-nonacarbonyl complexes, $Cp_2W_2Ir_2(CO)_6(\mu_3-CPh)(\mu_3-\eta^3-C_3Ph)$, and $Cp_2Ti(PhC\equiv CPh)$.

4. The method of claim 1, wherein said precursor is polymeric.

5. The method of claim 1, wherein said organic solvent is selected from the group consisting of $CH_2Cl_2$, $CHCl_3$, $CH_3OH$, $CH_3CH_2OH$, diethyl ether, glyme, diglyme, tetrahydrofuran, freons, benzene, toluene, dimethylsulfoxide, dimethylformamide, N-methyl pyrrolidone, hexane and pentane.

6. The method of claim 3, wherein said organic solvent is selected from the group consisting of $CH_2Cl_2$, $CHCl_3$, $CH_3OH$, $CH_3CH_2OH$, diethyl ether, glyme, diglyme, tetrahydrofuran, freons, benzene, toluene, dimethylsulfoxide, dimethylformamide, N-methyl pyrrolidone, hexane and pentane.

7. The method of claim 1, wherein the stoichiometry of M and X in the precursor is the same as in $M_aX_b$.

8. The method of claim 1, wherein there are multiple bonds between M and X in the precursor.

9. The method of claim 1, wherein b is zero and the product of pyrolysis is the metal M.

* * * * *